Figure 1:
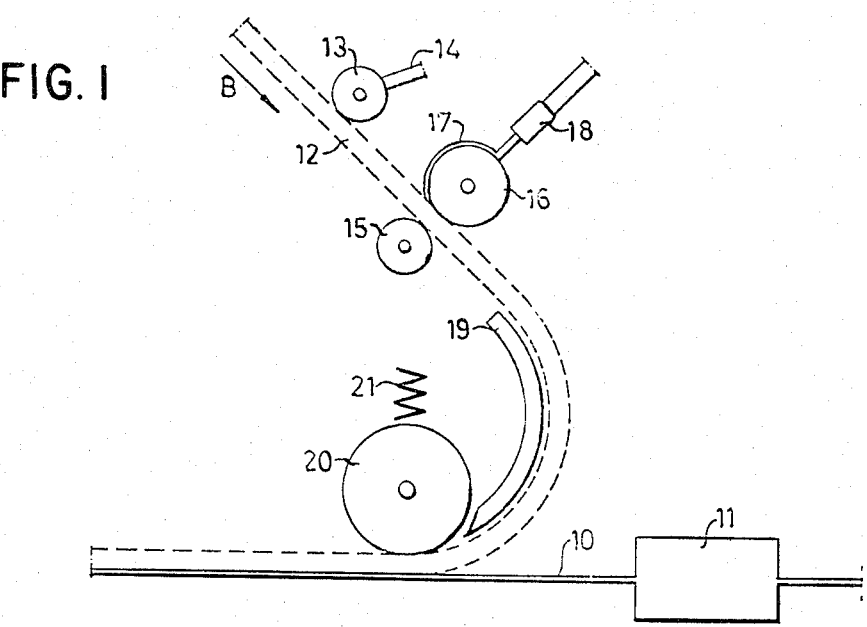

United States Patent [19]

Jonason

[11] 3,960,308

[45] June 1, 1976

[54] APPARATUS FOR AFFIXING SURFACE ENLARGING MEMBERS IN THE FORM OF COHERENT TRANSVERSALLY CORRUGATED METAL STRIPS TO ELONGATE METAL BASIC PROFILES

[76] Inventor: Karl Gunnar Jonason, Grindstuvagen 13, 724 62 Vasteras, Sweden

[22] Filed: Dec. 3, 1974

[21] Appl. No.: 529,130

Related U.S. Application Data

[62] Division of Ser. No. 435,993, Jan. 23, 1974.

[30] Foreign Application Priority Data

Jan. 29, 1973 Sweden................................ 012114

[52] U.S. Cl.................................... 228/5.1; 228/33; 228/35; 228/36; 228/229; 228/183; 29/202 R
[51] Int. Cl.². ............................................ B23K 1/12
[58] Field of Search....... 29/202 R, 202 D, 157.3 A, 29/157.3 D; 228/5.1, 15.1, 33, 35, 36, 229, 183

[56] References Cited
UNITED STATES PATENTS

| 1,556,627 | 10/1925 | Pritchard............................ 228/36 X |
| 3,108,367 | 10/1963 | Christman........................ 228/173 X |
| 3,123,905 | 3/1964 | Thomas............................ 228/173 X |
| 3,340,588 | 9/1967 | Mueller et al. ................. 29/157.3 A |
| 3,745,631 | 7/1973 | Jonason et al.................. 29/157.3 A |
| 3,762,031 | 10/1973 | Jonason et al.................. 29/157.3 D |

FOREIGN PATENTS OR APPLICATIONS 1,215,764  12/1970  United Kingdom............ 29/157.3 A

*Primary Examiner*—Al Lawrence Smith
*Assistant Examiner*—K. J. Ramsey
*Attorney, Agent, or Firm*—Haseltine, Lake & Waters

[57] ABSTRACT

Apparatus for affixing surface enlarging, transversally corrugated metal strips to elongate metal basic profiles which are advanced in the direction of their longitudinal axes whilst simultaneously being joined by a joining compound to the wave crests on one side of the corrugated metal strips. The apparatus provides a furnace for heating the basic profile to a temperature which exceeds the melting point of the joining compound, a device for advancing the metal strip longitudinally externally of the path of the basic profile while applying the joining compound to the crests and solidifying a suitable portion of the compound at respective crests by conducting heat away from the compound through the strip to material. The strip material with solidified joining compound on the crests of the corrugations is advanced in side-by-side relationship with a heated basic profile, the basic profile being brought into contact with the coated crests to cause heat from the profile to melt the joining compound, and in conjunction with this latter step conducting heat away from the joining compound through the strip material to solidify the joining compound and to establish a joint between each crest and the basic profile.

5 Claims, 9 Drawing Figures

APPARATUS FOR AFFIXING SURFACE ENLARGING MEMBERS IN THE FORM OF COHERENT TRANSVERSALLY CORRUGATED METAL STRIPS TO ELONGATE METAL BASIC PROFILES

This application is a division of co-pending application Ser. No. 435,993 filed Jan. 23, 1974, and claiming the priority of the application filed in Sweden, Jan. 29, 1973.

The present invention relates to a method of affixing surface enlarging members in the form of coherent, transversally corrugated metal strips to elongate metal basic profiles which are advanced in the direction of their longitudinal axes while simultaneously being joined by a joining compound to wave crests on one side of the corrugated metal strips.

In the manufacture of heat exchange elements it has been the normal practice to advance a corrugated metal strip material together with a basic profile in a continuous working operation and to permanently attach the strip material to the basic profile by means of one of a number of different joining techniques; this has especially been the normal practice in the manufacture of continuous lengths of heat exchange elements constructed of a basic profile which may have varying shape, e.g. have the form of strip, tube or the like. One method often applied in conjunction with the manufacture of such heat exchange elements is to solder the corrugated strip material firmly to one or both long sides of the basic profile. In accordance with this method the basic profile is provided on one or both sides thereof with a coating of solder, whereafter the solder is heated to a temperature above its melting point prior to advancing the basic profile continuously at a predetermined speed to a position of contact with the strip material, which latter is advanced in a movement path separate from the movement path of the basic profile. When the strip material is in contact with the molten solder on the basic profile, the solder solidifies at the contact point on the strip material, but as a result of the relatively low heat conductivity of the solder, it is necessary to hold the strip material pressed against the basic profile until a solder joint has been established. When this joint has been established, the profile material may be advanced from the aforementioned contact position with the surface enlarging member affixed thereto, and may be optionally cut into pieces of desired length.

One disadvantage associated with this method of manufacture is that because the corrugated strip material is only attached to the basic profile at spaced intervals therealong it is, to a certain extent, wasteful to cover the whole of the surface of the basic profile with solder.

Another criticism which can be directed to the aforementioned method is that the heat exchange properties of the end product are poor when the heat conductivity of the solder is lower than the heat conductivity of the material from which the basic profile is made.

Furthermore, it is difficult to press the corrugated strip material against the basic profile during the relatively long solder solidifying process, without deforming the strip material unfavorably; this difficulty is particularly manifest when the corrugated strip material is extremely thin. Apparatus designed to prevent the occurrence of so-called cold soldering lower the production rate, which is one of the basic reasons for developing the present invention, one of the prime objects of which is to enable the rate of manufacture to be increased without impairing the joint between the basic profile and the crests of the corrugated strip material abutting thereagainst.

The object of the invention is achieved by apparatus which carries out the steps of heating the basic profile to a temperature which exceeds the melting point of the joining compound, optionally removing oxides and applying flux at least to the crests on one side of the corrugated metal strip, advancing the metal strip longitudinally externally of the path of the basic profile while applying the joining compound to said crests and solidifying a suitable portion of said compound at respective crests by conducting heat away from said compound through the strip material, advancing the strip material with solidified joining compound on the crests of the corrugations thereof in side-by-side relationship with a heated basic profile, bringing said basic profile into contact with the coated crests of said strips to cause heat from the profile to melt said joining compound, and, immediately in conjunction with this latter step, conducting heat away from the joining compound through the corrugated strip material to solidify the joining compound and to establish a joint between each crest and its place of contact with the basic profile.

The apparatus according to the invention, comprises means for advancing a metal basic profile at a preferably constant speed in a movement path, through-passage type heating means arranged in said path; means for advancing the corrugated strip material in a movement path arranged to guide said strip material into longitudinal contact with the basic profile; and means arranged in the corrugated strip material movement path upstream of its contact position with the basic profile for applying solder to the crests of said corrugated strip material, at least on one side of said material.

The invention will now be described in more detail with reference to a number of embodiments thereof shown diagramatically in the accompanying drawing, additional features of the invention being made apparent in conjunction therewith.

Figure 2:
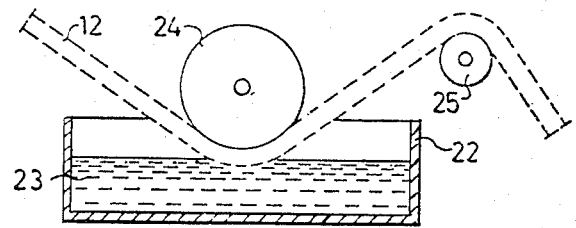
Figure 3:
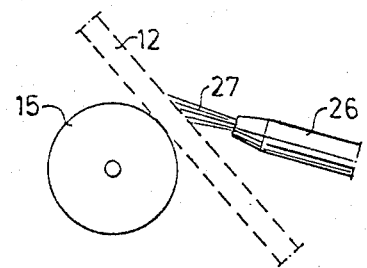
Figure 4:
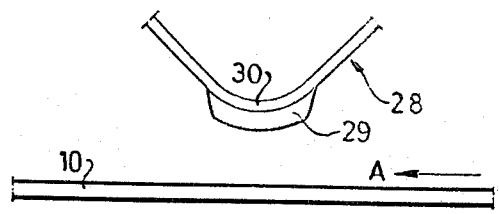
Figure 5:
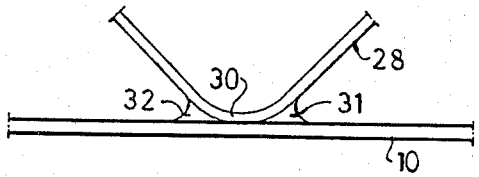
Figure 7:
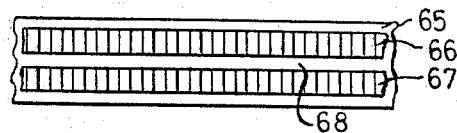
Figure 8:
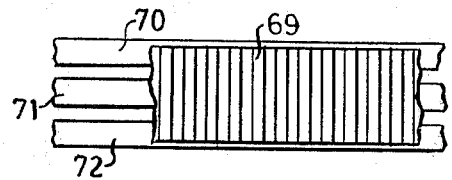
Figure 9:
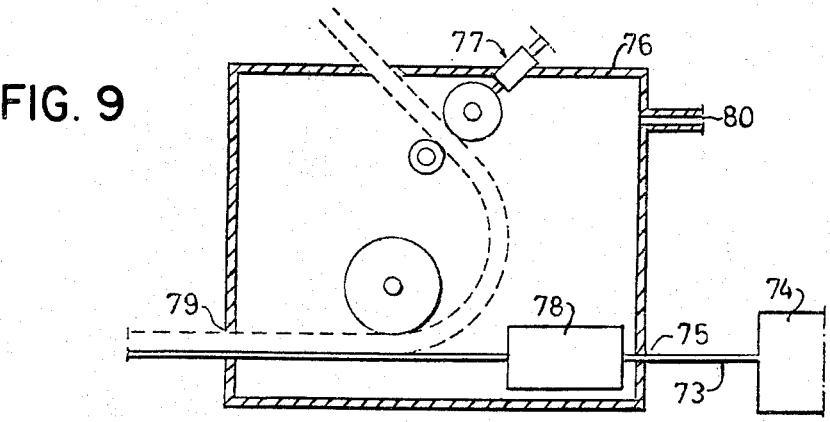
Figure 6:
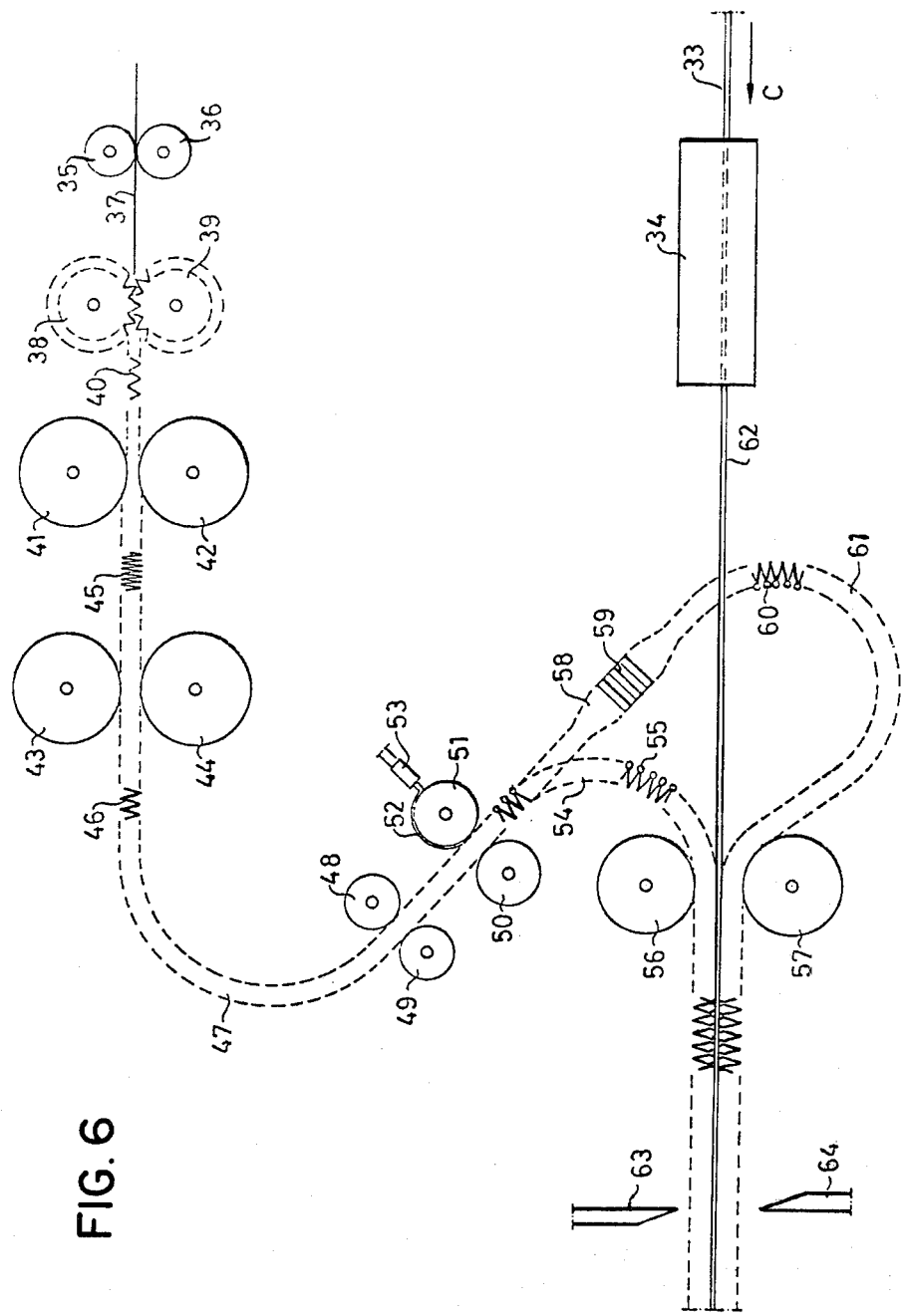

In the drawing, FIG. 1 is a side view of an apparatus constructed in accordance with the invention, said apparatus being shown diagramatically while practicing the method of the invention, FIG. 2 is an alternative embodiment of a solder applying device incorporated in the apparatus, FIG. 3 is a further alternative of said solder applying device, FIG. 4 shows in side view an advancing, heated basic profile and a cut-away single corrugation of the corrugated strip material, said single corrugation having been provided at the crest thereof with a quantity of solder which solidified at a point in the movement path of the strip prior to the strip being brought into contact with the basic profile, FIG. 5 shows the corrugation illustrated in FIG. 4 in a position subsequent to said corrugation having been brought into contact with the basic profile, FIG. 6 shows an embodiment of an apparatus constructed in accordance with the invention for carrying out the method of the invention when affixing strip material to both long sides of the basic profile, FIG. 7 shows an embodiment with which a basic profile is provided with two longitudinally extending lengths of strip on one or both long sides thereof, FIG. 8 shows an embodiment with which a number of basic profiles are advanced together and mutually joined by means of a common strip material, and FIG. 9 shows diagramatically an embodiment of an apparatus according to the invention encapsulated so as to maintain an inert atmosphere around the basic profile and the strip material being treated.

In FIG. 1, which illustrates diagramatically a simple embodiment of the invention, the reference numeral 10 identifies a basic profile which is assumed to be advanced at a pre-determined speed in the direction of the arrow shown. By basic profile is meant here a profile made of a metal which can be affixed to surface enlarging members made of the same metal or of a different metal by means of solder. The basic profile may have the form of a metal strip, a tube of generally rectangular cross-section or, as a further alternative, may comprise two or more superimposed metal strips mutually joined completely or partially to their respective adjacent surfaces. Further, the basic profile should have substantially planar longitudinally extending side surfaces for receiving the surface enlarging members.

The thickness of the basic profile places no limitations on the present invention, irrespective of whether the basic profile has the form of a tube or other hollow body, or is of solid construction such as solid strip, for example.

The basic profile is conveniently produced from a material having good conductivity, e.g. copper or copper alloy and is suitably of small thickness, e.g. in the region of 20–40 $\mu$m.

In the embodiment illustrated in FIG. 1, the basic profile, which moves in a path extending from the right to the left of the Figure, is assumed to have been pickled or degreased, so as to obtain a substantially oxide-free and grease-free joining surface. Subsequent to pickling or degreasing the basic profile, it is caused to pass through a heating furnace 11, in which the profile is heated to a temperature which exceeds the melting point of the solder to be used later in the process of affixing surface enlarging members to the basic profile; said heating furnace being of any construction suitable for the purpose. With regard to the temperature to which the basic profile is heated it can be mentioned that when, as a result of its thinness, the heat retaining capacity of the profile is low, i.e. the ability of the profile to store heat is poor, said temperature must be considerably higher than the melting point of the solder, for a reason to be hereinafter explained.

FIG. 1 also illustrates a loop 12 of strip material having corrugations extending transversally to the longitudinal direction thereof. The strip material may suitably be the same material as the basic profile, or when said strip comprises a different metal or alloy than the basic profile should be capable of being joined to said basic profile by soldering. In view of the requirement that the surface enlarging member 12 has good heat conducting properties and especially better heat conducting properties than the solder used for affixing said member to the basic profile 10, copper and its alloys are particularly suitable metals.

The loop 12 is advanced in the direction of the arrow B FIG. 1, optionally past and in contact with a roll 13, to which is applied flux via a nozzle or the like 14 and which is arranged to transfer the flux to the crests of the corrugated metal strip in abutment with and passing said roll. The metal strip then passes between two rolls 15 and 16, of which one, 15, forms a support or guide roll and the other, 16, an applicator roll for solder 17, which is applied to the periphery of the roll 16 and which leaves said roll at the point of contact with the crests on strip 12. The solder is applied to the roll 16 in a relatively uniform layer, e.g. through a nozzle 18. Since the solder is molten at its moment of contact with the crests of the corrugated strip a relatively fixed quantity of solder will solidify on the crests of the strip owing to the low temperature of said strip, and will be retained in a solidified condition during the continued advancement of the strip over a guide means 19, which guides the strip 12 into a movement path adjacent the movement path of the profile 10 and into contact with said profile.

At the moment of contact of each solder-coated crest of the corrugated strip 12 with the profile 10, which is advanced at the same speed as the strip 12, the heat from the profile 10 will cause the solder to melt momentarily, the heat being removed simultaneously via the strip corrugation, whereupon the solder solidifies practically instantaneously, to form a coherent joint between respective crests on the strip 12 and the profile 10. In order to bring the crests into the closest possible contact with the profile 10 there is used in accordance with the invention a holder means, for example, a roll 20 which may be journalled on a stationary shaft or on a resilient shaft actuated by a pressure spring 21, for example. A number of different arrangements are conceivable, for this purpose. FIG. 1 shows diagramatically a roll 16 arranged to apply solder 17 to the crests of the corrugated strip 12 as a prefered embodiment of the invention. As an alternative hereto FIG. 2 shows an arrangement which provides an essentially equivalent result as the embodiment of FIG. 1. The embodiment of FIG. 2, consists, in principle, of a vessel 22 arranged to contain a melt 23 of an appropriate solder. The corrugated strip 12 is shown to pass the surface layer of the melt 23 and is guided, for example, by rollers 24 and 25 to obtain suitable immersement of the loop 12 into the melt.

FIG. 3 shows a further, equivalent alternative of such an arrangement for applying solder to the crests of the strip or loop 12. With the embodiment of FIG. 3 there is provided a support roll 15, and a spray nozzle 26 is located on the opposite side of the loop 12, said nozzle being arranged to operate in conjunction with a metal spray for spraying solder 27 at a suitable angle towards the crests of the strip 12. Many different arrangements for applying solder to the crests of the corrugations are conceivable within the framework of the invention and are subsequently encompassed in principle by the invention.

To explain the mode of operation of the invention in conjunction with the actual soldering sequence more clearly, reference is made to FIGS. 4 and 5, in which is illustrated the basic profile 10 and a cut-away, single corrugation 28 of the described corrugated metal strip 12.

In FIG. 4 there is shown a solidified body of solder 29, which has previously solidified on the crest 30 of the aforementioned corrugation 28. Thus, FIG. 4 illustrates a situation in which the basic profile 10 passes to the left at a pre-determined rate in the direction of arrow A, while the corrugation 28 is advanced essentially in the same direction to approach the basic profile. At this point the temperature of the basic profile 10 is higher than the melting point of the solder 29, while the corrugation 28 and the solder 29 have a relatively low temperature, e.g. room temperature. As the metal strip 12 and the basic profile 10 contact each other, the solder 29 melts and forms fillets 31 and 32, which solidify immediately, the heat being conveyed away through the corrugation 28, so that finally the situation illustrated in FIG. 5 occurs, in which the crest of the corrugation 28 abuts the profile 10.

The method of the present invention can be applied in manufacturing processes comprising many different combination variants when attaching corrugated strip material to a basic profile. For example, in accordance with the invention an apparatus, such as a multiple-mill, can be produced in which lengths of the desired product can be produced in parallel relationship and provided on one or both sides thereof with the corrugated strip material.

A preferred embodiment of such a multiple-mill is shown diagrammatically in FIG. 6, although it will be understood that this embodiment is not restrictive of the invention. In FIG. 6, the reference numeral 33 identifies a basic profile which is advanced in the direction of arrow C through a heating furnace 34. In the illustrated embodiment of FIG. 6 it is assumed that initially there is used a relatively wide metal strip, which is cut longitudinally into lengths e.g. by means of rotary cutting rolls 35 and 36, the strip being divided into two or any desired number of separate strips 37. The strip 37 are then assumed to pass between corrugating rollers 38 and 39, which together fold or corrugate the strips 37 to the configuration indicated at 40 with relatively wide folds or corrugations. The thus corrugated strips are then passed through a compressing unit, comprising a roll pair 41, 42 and a roll pair 43, 44, the roll pair 43, 44 being driven at a lower peripheral speed than the roll pair 41, 42, which thus contributes to the corrugations obtaining the configuration indicated at 45 during their passage between two roll pairs.

When the corrugated strip material in all adjacently located corrugated strips leave the last roll pair 43, 44, the corrugations are widened slightly in comparison with the condition at position 45, as indicated in the Figure by the reference numeral 46. The strip material is then advanced in a loop 47 and is arranged to pass between two rolls 48, 49, one of said rolls 48 being used for applying a flux as previously mentioned. The loop then passes between a support roll 50 and an opposing roll 51 arranged to serve as an applicator roll for solder 52 supplied through a nozzle or the like 53. The solder solidifies on the corrugations passing the roll 51 in relatively well determinable quantities on the same side of all corrugated strips, when seen in the cross direction of the apparatus. After leaving the roll pair 50, 51, one or more strip portions are guided in a deviating loop 54 towards the profile 33, with quantities of solder 55 solidified to the crests of the strip corrugations, in between a guide roll pair 56, 57, soldering of the strip material being effected continuously against one side of the basic profile 33 in accordance with the description made with reference to FIG. 1, FIG. 4 and FIG. 5.

Returning to the position at which the corrugated material leave the roll pair 50, 51, one or more strip loops 58 may be guided in individual movement paths while the strip is twisted or turned substantially axially, as indicated at 59 for example, in a manner such that the solder-coated crests 60 on said strips face in the opposite direction to the direction in which they faced upon leaving the roll pair 50, 51. The strips or strip are then advanced with the solder-coated crests facing in said opposite direction in a loop 61 over guide roll 57, which is arranged to feed the loop 61 against side 62 of the profile 33, soldering of the two loops 54 and 61 to the profile 33 being effected simultaneously. Twisting or turning of the strip material 58 is necessary when the same side of all adjacently advanced corrugated strips is provided with solder from the same roll 51, since otherwise the solder on loop 61 would face away from the profile 33 when bringing the basic profile and strip together.

In the illustrated embodiment there is shown two co-acting cutters 63, 64, which are arranged to cut the product provided with surface enlarging members into pieces of suitable length during the manufacture of said products.

In accordance with the invention, the corrugated strip material can be affixed to the basic profile material in many different combinations. One example hereof is illustrated in FIG. 7, in which a basic profile 65 is shown provided along one or both long sides thereof with, for example, two separate corrugated strips 66, 67 which are attached in parallel relationship on the profile, with a space 68 between said strips.

FIG. 8 shows a further alternative, in conjunction with which a relatively wide strip material 69 is used and three basic profiles 70, 71 and 72 are attached to said strip.

In view of the fact that the possibility of counteracting oxidation of the starting material is highly desirable, it is assumed in accordance with the invention that the component parts of the apparatus can be enclosed in a chamber containing an inert gas. A principle embodiment of such an apparatus is shown diagrammatically in FIG. 9, in which the profile material 73 is advanced through a station 74 for removing greases and oxides. Subsequent to cleansing the profile 73, the profile is fed through an infeed opening 75 in a chamber 76, which substantially encloses the component 77 of the apparatus, of which component a through-pass furnace 78 is shown. Subsequent to soldering the corrugated strip to the basic profile in the chamber 76, the finished product is fed out of the chamber through an outfeed opening 79. An inlet 80 communicates with the chamber 76 for introducing an inert gas thereinto. In this way it is possible to avoid oxidation of the profile 73, which is heated to high temperature, and also to protect the strip material against oxidation.

When practicing the method of the invention, there should be used a solder which has a lower heat conductivity than the corrugated strip material, so that it is possible to obtain the highest possible production speed for the product without risk of so-called cold soldering.

If the basic profile is made from a copper alloy, a suitable temperature to which said profile can be heated is of the order of magnitude of 450°C and the solder should be maintained at a temperature below approximately 100°C, in order to obtain sufficiently great temperature difference for the soldering operation. Although the invention can be applied in conjunction with the use of corrugated strip material of any thickness, a strip thickness of down to 10 μm is preferred with all applications of the method.

The invention is not restricted to the described and illustrated embodiments thereof, but can be modified within the scope of the accompanying claims.

What we claim is:

1. Apparatus comprising means for continuously advancing a metal basic profile in a movement path at a substantially constant speed, heating means arranged in said movement path for heating said basic metal profile to an elevated temperature, means for continuously feeding corrugated strip material in a movement path arranged to guide said strip material into side-by-side contact with the basic profile at a location downstream of the heating means, and means arranged in the movement path of the strip material upstream of its point of contact with the basic profile for applying solder to the crests of the corrugations of said corrugated strip material, at least on one side of said material, said solder being solidified at said crests as the corrugated strip material approaches the location of contact with the basic profile, said basic profile at said location of contact having a temperature sufficiently high to melt said solder and effect joinder of the corrugated strip material at said crests to said basic profile.

2. An apparatus according to claim 1, adapted to treat a multiple of basic profiles advanced in side-by-side relationship and including generally separate means for advancing, guiding and soldering the corrugated strip material to the basic profile.

3. An apparatus according to claim 1 wherein said solder applying means is arranged to solder corrugated strip lengths to both long sides of said basic profile.

4. An apparatus according to claim 3, comprising a common solder applicator means arranged to apply solder to the long sides of all strip lengths facing in the same direction, and for said basic profile there is provided a deflecting means for the solder-coated strip material intended to be affixed to one side of the basic profile, said means being located upstream of the point of contact of said material with the basic profile.

5. An apparatus according to claim 1 comprising cooling means between said solder applying means and the location of contact between the corrugated strip material and the basic profile for effecting solidification of the applied solder prior to contact of the strip material with said basic profile.

* * * * *